Patented Oct. 14, 1947

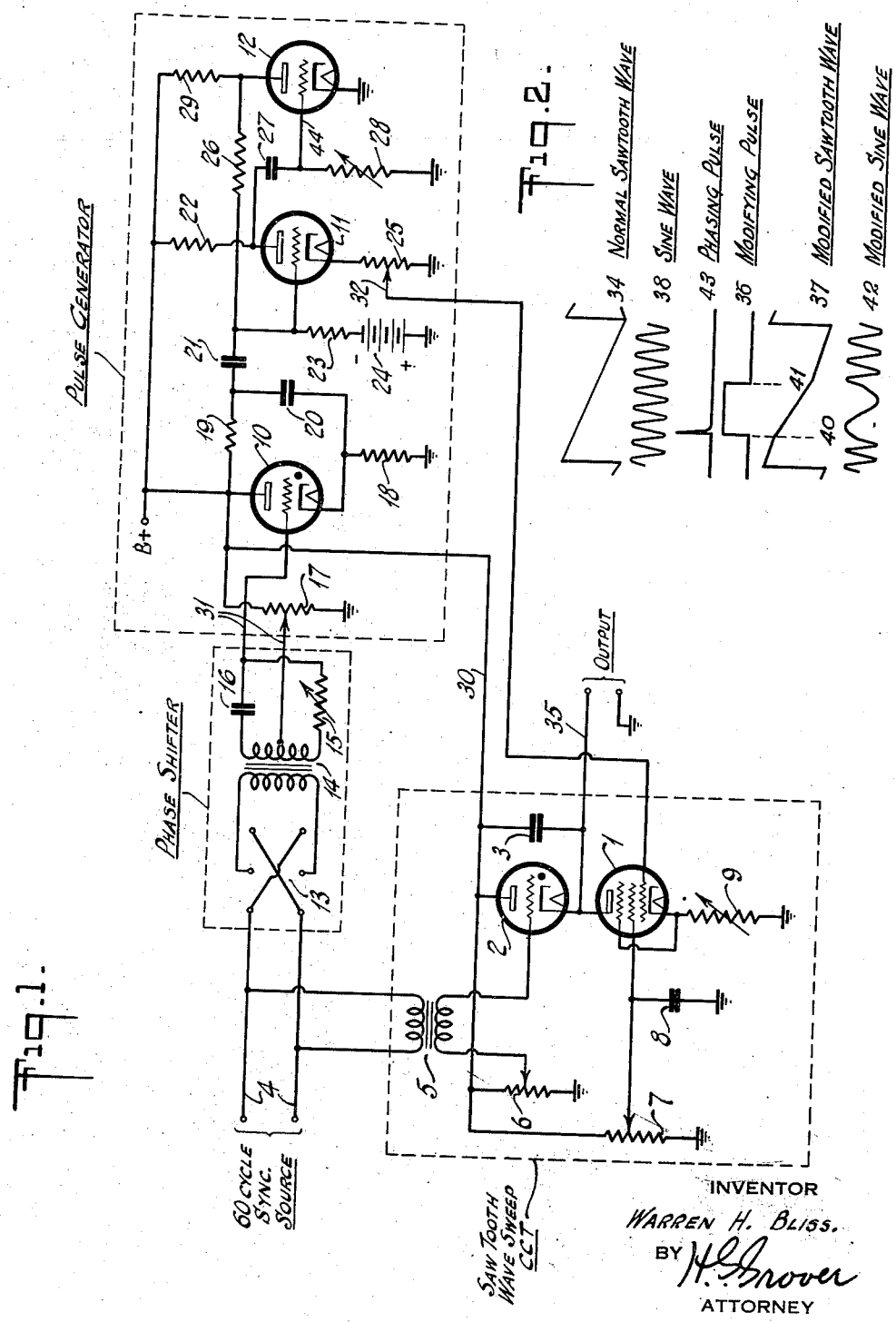

2,428,926

UNITED STATES PATENT OFFICE 2,428,926

MODIFIED SWEEP CIRCUIT FOR CATHODE-RAY TUBES

Warren H. Bliss, Orono, Maine, assignor to Radio Corporation of America, a corporation of Delaware Application June 4, 1943, Serial No. 489,635

4 Claims. (Cl. 250—27)

This invention relates, generally, to systems employing cathode ray tubes for obtaining oscillographic observations of wave forms. Known types of systems employing such cathode ray tubes, mentioned herein by way of illustration, are: (1) Measuring systems for determining frequency response characteristics of electrical networks; (2) radio plane locators; and (3) scanning receivers for scanning a given frequency band of the radio spectrum and for locating signals which appear therein.

For most of the applications in which cathode ray oscilloscopes are used, a linear time base or sweep circuit is employed. There is a demand, however, in some kinds of oscillographic observations for increasing the definition at a given point in the cathode ray sweep path so that a given detail of the reproduced wave form may be expanded for closer scrutiny.

The present invention, broadly stated, comprises a circuit for producing a normally linear or saw-tooth sweep voltage which can be modified in such a way as to amplify or expand any desired portion of the otherwise linear time base. Systems for accomplishing the same general purpose of the present invention have heretofore been proposed, and are described in Sherman United States Patent 2,175,001, granted October 3, 1939, and in Wolff United States Patent 2,300,189, granted October 27, 1942. The system of the present invention is an alternative arrangement which has advantages over the known systems in many applications.

One of the objects of the present invention is to provide a time base for a cathode ray oscilloscope which allows a wide spreading of a comparatively narrow pulse of periodic nature, such as used in ionosphere measurements and radio plane locators.

Another object is to provide a linear time base modifying circuit which has a wide degree of flexibility of control and adjustment.

A further object is to provide a simple and efficient circuit for expanding any desired portion of the linear part of a saw-tooth voltage wave without altering the overall saw-tooth velocity.

A still further object is to provide an improved circuit for modifying a desired portion of a triangular voltage wave.

Other objects and the features of the invention will appear from a reading of the following description in conjunction with an accompanying drawing, wherein:

Fig. 1 illustrates a specific circuit embodiment of the present invention, and

Fig. 2 graphically illustrates, by means of a plurality of curves, the operation of the system of Fig. 1.

The system of Fig. 1 comprises, essentially, three units surrounded by dash lines and labeled "Saw-tooth wave sweep circuit," "Phase shifter" and "Pulse generator." The "Saw-tooth sweep circuit" is, in effect, a conventional saw-tooth generator, while the "Pulse generator" includes an unbalanced or unstable vacuum tube trigger circuit and a saw-tooth voltage generator for controlling the trigger circuit.

The saw-tooth wave sweep circuit serves to generate a triangular wave form and more particularly saw-tooth wave form oscillations and comprises, in the particular embodiment shown, a gaseous tube 2 which is arranged to rapidly discharge a condenser 3 suddenly and periodically through the space path of the tube after the charge on condenser 3 has reached a critical value. Normally, the condenser 3 is charged at a uniform rate through a constant current limiting pentode vacuum tube 1. The gaseous tube 2 is a grid-controlled tube of the "Thyratron" type and has its grid connected through the secondary winding of an audio transformer 5 to the sliding contact of a bias control potentiometer 6. The primary winding of transformer 5 is connected to a 60 cycle synchronizing source through leads 4. The screen grid of pentode 1 is connected to a condenser 8 and to a tap on pontentiometer 7, both of which serve to maintain the screen grid at a stable direct current value. The cathode and the suppressor grid of pentode 1 are connected together and to ground through a variable resistor 9. Variable resistor 9 controls the linear rate of charge of condenser 3. When the voltage on condenser 3 reaches a critical value which occurs when the positive voltage on this condenser overcomes the negative bias on the grid of gas tube 2, a discharge path is established through the tube 2. The 60 cycle synchronizing source, labeled as such, assures the break down of gas tube 2 at a desired point in the cycle of operations. The output of the sweep circuit is connected through lead 35 to a suitable output circuit for applying 60 cycles per second saw-tooth waves thereto. This output circuit (not shown) may be the horizontal deflection plates of the cathode ray tube, or, if desired, a reactance tube for causing a superheterodyne receiver to scan at a substantially uniform rate a predetermined portion of the radio frequency spectrum. A suitable output circuit of the last type is described in my copending application Serial No. 461,526, filed October 10, 1942.

The "Pulse generator" provides square or rectangular wave pulses, and comprises a saw-tooth generator in the form of a grid-controlled gaseous or glow tube 10 (Thyratron) and associated impedance elements for controlling the action of an unstable or unbalanced trigger circuit in the form of two interconnected vacuum tube triodes 11 and 12. This pulse generator is supplied with energy from the 60 cycle synchronizing source over leads 31 through the phase shifter. The phase shifter consists of a 60 cycle transformer 14 whose primary winding is connected to a reversing switch 13 and whose secondary winding has shunted across it a condenser 16 and a variable resistor 15. The junction of the condenser 16 and variable resistor 15 is connected to the grid of the gas tube 10. The center point of the secondary winding of transformer 16 is connected to a tap on the bias resistor 17 which supplies negative bias for the grid of gas or glow tube 10. A condenser 20 is connected between the cathode and anode electrodes of gas tube 10 through a low value series resistor 19. The end of condenser 20 which is connected to the cathode of tube 10 is also connected to ground through a high value resistor 18. The anode of gas tube 10 is connected to a positive terminal B+ of a source of anode polarizing potential (as shown) while the cathode is connected to the upper terminal of resistor 18. Condenser 20 charges up at an approximately linear rate through resistor 18, and when this charge reaches a critical value overcoming the negative bias on the grid of tube 10, the condenser 20 discharges through the tube 10. During each discharge period, a sharp pulse of voltage is developed across resistor 19 as the condenser 20 discharges through the interelectrode space of gas triode 10. The phase or position of this pulse can be adjusted to any desired position relative to the saw-tooth cycle by means of switch 13 and variable resistor 15 of the phase shifter.

The sharp pulse developed across resistor 19 is applied to trip the unbalanced or unstable trigger circuit composed of interconnected vacuum tubes 11 and 12. The grid and anode electrodes of these two tubes are interconnected to provide a regenerative action. Resistors 22 and 29 are connected between the positive terminal B+ of a source of anode polarizing potential and the anodes of tubes 11 and 12, respectively. The anode of tube 11 is connected to the grid of tube 12 through a condenser 27, while the anode of tube 12 is connected to the grid of tube 11 through a resistor 26. The grid of tube 11 is connected to the negative terminal of a battery 24 which biases tube 11 to be non-conductive in the normal or stable state of the trigger. The grid of tube 12 is connected to ground through lead 44 and variable resistor 28. The cathode of tube 12 is directly connected to ground, while the cathode of tube 11 is connected to ground through resistor 25 which has a variable tap 32 thereon extending to the control grid of pentode 1 of the saw-tooth wave sweep circuit. Normally, in the operation of the trigger circuit, tube 11 is non-conductive and biased to cut-off by battery 24. Tube 12 is, however, normally conductive and passes current because the grid is maintained at substantially zero bias. This condition of operation wherein tube 11 is normally non-conductive and tube 12 conductive is called the stable state. In the active or unstable state, which is produced by the sharp pulse of relative positive polarity developed across resistor 19 and applied to the grid of tube 11, the current passing conditions of tubes 11 and 12 are reversed from that just described. After an interval of time in the active state, depending in part upon the values of resistor 28 and condenser 27, the trigger will restore itself to the stable state. It will thus be seen that the unbalanced or unstable trigger circuit has only one degree of electrical stability.

An exposition of the operation of the system will now be given with particular reference to the curves of Fig. 2. The saw-tooth wave sweep circuit comprising a grid-controlled gas tube 2 and constant current regulator pentode 1 produces saw-tooth waves of the form of curve 34 of Fig. 2 at a 60 cycle rate. Of course, if desired, the cyclic operation of the charge and discharge of condenser 3 can be synchronized to any integral submultiple of 60 cycles by proper adjustment of the slider on potentiometer 6 and the value of resistor 9. The operation of this type of sweep circuit is well known in the art and repeated saw-tooth waves having the form of curve 34 of Fig. 2 will appear in the output between lead 35 and ground.

The second saw-tooth generator comprising grid-controlled gas tube 10 and associated elements in the pulse generator will cause condenser 20 to charge through resistor 18 at an approximately uniform rate and to discharge periodically through gas triode 10. During each discharge period a sharp pulse of voltage of wave form 43 (Fig. 2) is developed across resistor 19. The phase or position of this voltage pulse of wave form 43 can be adjusted to any desired position relative to the saw-tooth cycle wave 34 by means of switch 13 and variable resistor 15 of the phase shifter.

Voltage pulse 43 of Fig. 2 and of relatively positive polarity is applied to the grid of tube 11 of the trigger circuit to trip the trigger, thus causing tube 11 to fire or conduct and causing tube 12 to cease conducting. The tripping of the trigger circuit produces a charge on condenser 27, and the active state of the trigger will persist until the charge on condenser 27 has dissipated through resistor 28 to a critical value, such that its discharge current no longer develops sufficient current through resistor 28 to maintain the tube 12 biased to cut off. The trigger circuit develops a square or rectangular wave pulse across its cathode resistor 25 of the wave form 36 shown in Fig. 2.

The square wave pulse 36 is applied by tap 32 on resistor 25 directly to the control grid of pentode 1 of the sweep circuit in order to alter the rate at which condenser 3 of the sweep circuit is charged. Normally, in conventional practice, condenser 3 is charged at a uniform rate by a constant current through pentode 1. By means of the present invention, the charge rate of condenser 3 is increased to a higher value during part of the saw-tooth cycle when square wave 36 is applied to the control grid of pentode 1. This action modifies the saw-tooth voltage as shown in wave form 34 to a modified form as shown in wave form curve 37 of Fig. 2. In this wave form 37 the slope from point 41 has been increased to a greater value during the period of application of square pulse 36. In order to assure proper synchronism of the modified wave form with the 60 cycle source, it may be necessary, depending upon the extent of modification, to vary the value of resistor 9 or the position of the tap on resistor 6.

By way of explanation of how the invention produces a useful and valuable result, wave form curves 38 and 42 of Fig. 2 are given. Wave form curve 38 shows a sine wave of voltage as it appears on the screen of a cathode ray tube when a conventional linear time base or saw-tooth sweep is used. Wave form curve 42 shows the appearance of a sine wave on the cathode ray screen when a sweep wave like that of form 37 is used. In this case a short portion of the sine wave has been greatly expanded so that it is displayed on the cathode ray screen in great detail. By proper manipulation of switch 13 and variable resistors 15 in the phase shifter and resistor 28, and the sliding contact of resistor 25 of the trigger, any desired portion of the saw-tooth cycle may be modified to expand a given detail of the wave form being viewed on the screen. In practice, it may also be necessary to readjust variable resistor 9 in the sweep circuit in order to keep the same initial saw-tooth sweep frequency.

The principles of the present invention can also be used to obtain a compression of any desired portion of the saw-tooth wave rather than an expansion, and this can be achieved by applying to the control of pentode 11 a rectangular wave similar to pulse 36 of Fig. 2 but of opposite polarity.

What is claimed is:

1. The combination with a triangular wave generator including a condenser and circuits for charging and periodically discharging said condenser, of an unbalanced trigger circuit for altering the rate of charge of said condenser over only a part of its charge cycle, said trigger circuit comprising a pair of vacuum tubes each having a cathode, a control electrode and an anode, one of said tubes being normally conductive and the other of said tubes being normally non-conductive in the stable state of the trigger circuit, means to provide a cutoff bias for the grid of said normally non-conducting tube, means including a resistor for the grid of said normal conducting tube whereby said grid is maintained at substantially zero bias, a condenser coupling said normally conducting tube grid to the anode of said normally non-conducting tube, said resistor and said condenser together being operative to restore said trigger circuit to the stable state after a predetermined time interval in the unstable state, and means for applying sharp voltage pulses of predetermined polarity in synchronism with the frequency of the triangular wave generator to trip said trigger from its stable state to its unstable state.

2. The combination with a saw-tooth wave generator having a condenser, a circuit for charging said condenser at a uniform rate including a constant current regulator tube, and a circuit for discharging said condenser including a gaseous tube in shunt to said condenser, of means for altering the normal rate of charge of said condenser including a pulse generator operating in synchronism with said saw-tooth wave generator, and a connection for supplying pulses from said pulse generator to a control electrode of said constant current regulator tube.

3. The combination with a saw-tooth wave generator having a condenser, a circuit for charging said condenser at a uniform rate including a constant current regulator tube, and a circuit for discharging said condenser including a gaseous tube in shunt to said condenser, a source of stable low frequency current for synchronizing the operation of said saw-tooth wave generator, of means for altering the normal rate of charge of said condenser including a pulse generator, a connection for supplying pulses from said pulse generator to a control electrode of said constant current regulator tube, and a circuit for controlling said pulse generator from said source of synchronizing current.

4. The combination with a saw-tooth wave generator having a condenser, a circuit for charging said condenser at a uniform rate including a constant current regulator tube, and a circuit for discharging said condenser including a gaseous tube in shunt to said condenser, a source of stable low frequency current for synchronizing the operation of said saw-tooth wave generator, of means for altering the normal rate of charge of said condenser including a square wave pulse generator, a connection for supplying pulses from said pulse generator to a control electrode of said constant current regulator tube, and a circuit for controlling said pulse generator from said source of synchronizing current, said last circuit including a phase shifter for enabling said pulse generator to produce pulses at any desired position relative to the saw-tooth cycle.

WARREN H. BLISS.

REFERENCES CITED

The following references are of record in the file of this patent:

UNITED STATES PATENTS

| Number | Name | Date |
|---|---|---|
| 2,166,688 | Kell | July 18, 1939 |
| 2,037,577 | Harries | Apr. 14, 1936 |
| 2,266,516 | Russell | Dec. 16, 1941 |
| 2,300,189 | Wolff | Oct. 27, 1942 |
| 2,215,197 | Sherman | Sept. 17, 1940 |
| 2,075,140 | Schlesinger | Mar. 30, 1937 |
| 2,047,533 | Von Ardenne | July 14, 1936 |
| 2,368,448 | Cook | Jan. 30, 1945 |
| 2,368,449 | Cook | Jan. 30, 1945 |
| 2,406,382 | Kellogg | Aug. 27, 1946 |
| 2,375,709 | Thompson | May 8, 1945 |